US006424625B1

(12) United States Patent
Larsson et al.

(10) Patent No.: US 6,424,625 B1
(45) Date of Patent: Jul. 23, 2002

(54) METHOD AND APPARATUS FOR DISCARDING PACKETS IN A DATA NETWORK HAVING AUTOMATIC REPEAT REQUEST

(75) Inventors: Peter Larsson, Euro Asia View; Mikael Larsson, Doer Park, both of (SG)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/179,952

(22) Filed: Oct. 28, 1998

(51) Int. Cl.$^7$ ................................................. H04L 12/26
(52) U.S. Cl. ...................................... 370/236; 370/410
(58) Field of Search ................................ 370/389, 394, 370/410, 426, 428, 429, 470, 471, 473, 236; 714/748, 749, 750

(56) References Cited

U.S. PATENT DOCUMENTS

| 4,344,171 A | * | 8/1982 | Lin et al. ..................... 714/751 |
| 4,726,027 A | * | 2/1988 | Nakamura et al. ........... 714/748 |
| 5,483,545 A | * | 1/1996 | Darmon et al. .............. 714/748 |
| 5,826,028 A | | 10/1998 | Bennett et al. |
| 6,163,861 A | * | 12/2000 | Yoshioka et al. ............ 714/712 |

FOREIGN PATENT DOCUMENTS

WO        98/42108        9/1998

OTHER PUBLICATIONS

Heliomar M. de Lima and Otto Carlos M.B. Duarte, "A Go–Back–N Protocol with Multicopy Retransmission for High Speed Satellite Communications", 1994, pp. 859–863.
F. Argenti and G. Benelli, "An ARQ Protocol For Mobile Radio Systems", 1992, pp. 1323–1326.
Nachum Shacham and Byung Cheol Shin, "A Selective–Repeat–ARQ Protocol for Paralle Channels and Its Resequencing Analysis", Apr. 1992, pp. 773–782.
Standard Search Report dated Jul. 16, 1999.

* cited by examiner

Primary Examiner—Kwang B. Yao
(74) Attorney, Agent, or Firm—Burns, Doane, Swecker & Mathis, L.L.P.

(57) ABSTRACT

Techniques are provided for use with automatic repeat request (ARQ) schemes in a data network to minimize a bandwidth used by a receiver and a transmitter in the network to transfer data packets, by discarding outdated packets that have not yet been successfully transferred. In accordance with an embodiment of the invention, a bit is set in the ARQ packet header to force the receiver to accept packets subsequent to one or more erroneous or unreceived packets that have been discarded and not resent. In accordance with another embodiment of the invention, after data packets have been discarded, sequence numbers are reassigned to the non-discarded data packets that are yet to be sent to the receiver, so that a transmitted stream of the non-discarded packets will have consecutive sequence numbers.

19 Claims, 12 Drawing Sheets

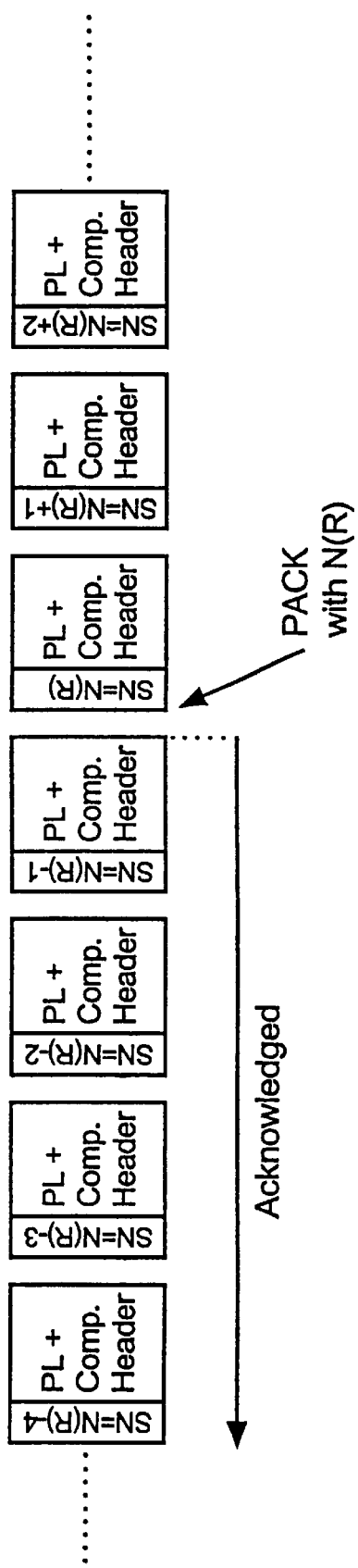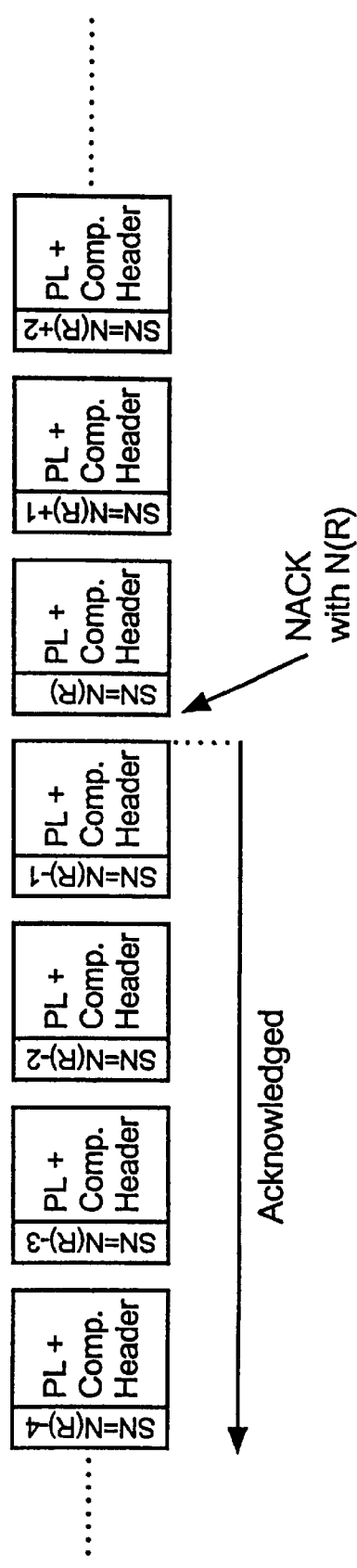

METHOD AND APPARATUS FOR DISCARDING PACKETS IN A DATA NETWORK HAVING AUTOMATIC REPEAT REQUEST

FIELD OF THE INVENTION

The present invention relates to Automatic Repeat Request (ARQ) techniques for transferring data in fixed/wireless data networks.

BACKGROUND OF THE INVENTION

ARQ techniques are commonly used in data networks to ensure reliable data transfer and to protect data sequence integrity. Data packets are encoded with an error detecting code, so that when a transmitter in the data network sends or transfers data packets to a receiver in the data network, the receiver receiving the data packets can detect corrupted, erroneous or lost packets and thereby request that the transmitter retransmit the affected data packets. The integrity of a data sequence is normally protected by sequentially numbering packets and applying certain transmission rules.

There are three main ARQ schemes: Stop-and-Wait; Go-Back-N; and Selective Reject (sometimes referred to as Selective Repeat). All three methods provide mechanisms for transferring packets to a receiver in a data network in an appropriate order. In terms of throughput efficiency as a function of the signal to noise ratio, generally Selective Reject is most efficient, Stop-and-Wait is least efficient, and Go-Back-N is intermediate. Also, various mixtures of the Selective Reject and Go-Back-N techniques exist, and fall between pure Selective Reject and pure Go-Back-N techniques in both efficiency and complexity.

With respect to Go-Back-N, several different variants exist which differ in terms of how they use positive acknowledgments (PACKs), negative acknowledgments (NACKs), retransmission timers, polling schemes, etc.

One type of Go-Back-N technique uses both PACKs and NACKs that have the following characteristics:

A PACK for a data packet having a sequence number N(R) gives a cumulative positive acknowledgment for data packets having sequence numbers before N(R), but does not positively acknowledge the data packet having the sequence number N(R), as shown for example in FIG. 1A.

The NACK positively acknowledges all data packets before the data packet it negatively acknowledges. The data packet which the NACK negatively acknowledges is indicated by N(R), as shown for example in FIG. 1B.

FIG. 2 shows a simplified ARQ transmitter window, in which five variables are used to keep track of a transmitter state. The five variables include: a bottom sequence number, BSN; a top sequence number, TSN; a maximum top sequence number, $TSN_{MAX}$; an instant sequence number, ISN; and an expected sequence number, ESN.

BSN denotes the oldest packet in the transmitter buffer, and can also indicate that all packets before the BSN packet have been acknowledged or discarded. Packets prior to the packet indicated by TSN have been sent. ESN denotes the expected sequence number of a packet to be received. ISN indicates the sequence number of the next packet to be sent. When a packet is sent for the first time, TSN and ISN will be identical. However, when a retransmission is performed, ISN will start over from the first retransmitted packet and progress in consecutive order, one packet at a time, up to TSN. TSN cannot exceed $TSN_{MAX}$, which is defined by the window size W. Assuming that a sequence number field has k bits, $2^k$ different sequence numbers can be created. Thus, the maximum size W of the window shown in FIG. 2 is $2^k-1$.

Operation of the Go-Back-N technique using both PACKs and NACKs can be envisioned by imagining a clockwise consecutive modulo $2^k$ sequence numbering superimposed upon the circumference of the circles shown in FIGS. 3A–3D. FIG. 3A shows a circle indicating a state where no packets have yet been sent, and TSN, ESN, BSN and ISN all have the same value, i.e., point to the same packet. The circle shown in FIG. 3B indicates that (TSN-BSN) packets have been sent and also received, since ESN=TSN. An erroneous or lost packet causes ESN to stop progressing forward, although more packets have been sent. For example, in FIG. 3C packets up to the packet indicated by TSN and ISN have been sent, but ESN indicates a prior packet which was not received. After a packet is lost or an erroneous packet is received, the ARQ receiver sends a NACK to the ARQ transmitter to inform the ARQ transmitter about the lost or erroneous packet. The NACK includes a returned sequence number N(R) that is set equal to ESN, thereby acknowledging that all previous packets were correctly received. BSN and ISN are set equal to ESN (and N(R)) so that BSN moves forward and ISN moves backward to the sequence number representing the lost or erroneous packet. Thereafter, as shown in FIG. 3D, ISN and ESN move forward together as the lost or erroneous packet is retransmitted, and as the succeeding packets are also retransmitted.

FIGS. 4A–4D illustrate use of a PACK. For example, FIG. 4A shows a state where nothing has yet been sent, and TSN=ISN=BSN=ESN. FIG. 4B shows a situation where all sent packets have been correctly received. FIG. 4C shows that a timer-initiated PACK is sent, conveying the sequence number N(R) of a packet between BSN and TSN=ESN= ISN. As shown in FIG. 4D, after the PACK is sent, BSN is set to N(R).

Sending PACKs ensures that sequence number starvation does not occur. Since TSN may not pass BSN, if the transmitter does not receive PACKs, it may continue to send data packets up to $TSN_{MAX}$. However, if data packets up to $TSN_{MAX}$ are sent but no PACKs are received, then $TSN_{MAX}$ cannot progress and sequence number starvation occurs. The transmitter must wait until it receives a PACK, which will allow BSN and thus $TSN_{MAX}$ to progress.

FIG. 5 shows a general example of an ARQ data packet 510. The packet 510 typically includes an ARQ header 512 and a data portion 516. The header 512 contains a k-bit sequence number 514, and can be located at the front of the packet 510 as shown in FIG. 5, or at any predefined position within the packet 510.

FIG. 6 shows an exemplary ACK message 610, with an identifier field 612 that identifies the responding terminal sending the ACK message 610, a NACK/PACK type indicator 614 indicating whether a PACK or a NACK is being sent, and finally a sequence number field N(R) 616 that indicates for which sequence number the ACK message 610 is valid.

In a Selective Reject scheme, a sender window having a size of $2^{k-1}$ or less is normally used in order to avoid certain ambiguities which appear in conjunction with an automatic (timer-initiated) retransmission. The receiver window size in a Selective Reject scheme can include up to $2^{k-1}$ positions, instead of just one position as in a Go-Back-N scheme. In Selective Reject a range of packets can be received since the receiver window can include up to $2^{k-1}$ positions.

As long as packets are received correctly, they are sent or forwarded to the next higher layer. When an outstanding packet is detected, i.e., a packet that has been sent but not received or not correctly received, the sending of subsequent packets up to the higher layer is halted and a list of correct and missing packets is built up. A NACK is used to initiate a request for a retransmission of the outstanding packet or of a multitude of outstanding packets. When the first detected outstanding packet is correctly received, that packet and all subsequent packets are sent to the higher layer, until the next outstanding packet is detected and the process repeats with respect to the new outstanding packet.

FIG. 7A, for example, shows a situation wherein three packets are outstanding. The outstanding packets are denoted by ESN1, ESN2 and ESN3. The receiver sends one or several NACKs indicating the sequence number of these outstanding packets. In FIGS. 7B and 7C, the transmitter has received the one or several NACKs and in response retransmits the outstanding packets. The transmission of new packets can proceed to the $TSN_{MAX}$ limit, which of course can also occur when no NACKs are received. In particular, FIG. 7B shows a situation where ESN1 has been retransmitted and correctly received, and ESN2 is currently being retransmitted. BSN has also been set to ESN1. In other words, the NACK for ESN1 functions as a cumulative positive acknowledgment for packets preceding ESN1, and BSN is adjusted accordingly.

Sometimes, NACKs fail to reach the transmitter for unknown reasons. In such a situation, after a specified or predetermined time has expired, packets in the sender buffer that have not been acknowledged (by either a NACK or a PACK) can be automatically retransmitted.

NACKs can be efficiently sent by sending a NACK and explicitly indicating the oldest NACK's sequence number, here represented by ESN1, and using a bitmap to thereafter represent correctly received packets and missing packets. This type of NACK performs a cumulative PACK for the packets preceding the sequence number which is NACKed. Other NACK options can also be used, for example NACK options where a cumulative positive ACK is not performed or sent for the packets preceding the sequence number which is NACKed.

The Selective Reject and Go-Back-N techniques differ in the sense that Selective Reject does not require packets to be sent in any particular order, while the Go-Back-N receiver needs to receive packets in consecutive sequence number order.

Normally, in data networks it is desirable to transfer all packets without any packet loss. Sometimes, however, sending significantly delayed packets provides no benefit, for example where the delay causes the information in the packets to become outdated and therefore useless to the receiver. Examples of delay sensitive applications are, e.g., telephony, video conferencing and delay sensitive control systems.

Furthermore, non-time-critical applications commonly issue higher level retransmissions whenever they detect an absence of responses or acknowledgments from the receiving end, which can give rise to situations where the ARQ buffers are filled with not-yet-successfully transmitted data, and/or with newly retransmitted data. This can be avoided if data is associated with a validity time, and the validity time is set to be slightly shorter than the retransmission time for the application. However, in practice it can be difficult or impossible to discern which retransmission time is used, since the lower layer (LLC) is unaware which application is at the top level. In such a situation one has to assume a certain application and specially design the communication system based on that assumption.

For certain service classes and after a certain transfer delay time, discarding of data packets is allowed in Asynchronous Transfer Mode (ATM). An ARQ in conjunction with ATM can use transfer delay information provided by the ATM layer in order to adjust connection-specific discard timers in the ARQ function. However, the ARQ in the receiver may detect missing or incomplete packets and require retransmission.

In summary, current ARQ methods do not recognize and allow for situations where data packets have a limited lifetime, and therefore fail to minimize bandwidth usage by not sending (or resending) significantly delayed or outdated data packets.

SUMMARY OF THE INVENTION

In accordance with exemplary embodiments of the invention, ARQ techniques are provided that minimize bandwidth usage by accounting for data packets that have an arbitrary but limited lifetime. The lifetime can either be assumed to be fixed, or can be deduced from ATM layer information. In particular, exemplary embodiments of the invention variously illustrate enhanced Go-Back-N and also Selective Reject techniques that discard outdated data packets, and which embody principles that can be applied to Stop-and-Wait techniques to discard outdated data packets.

In accordance with an embodiment of the invention, a bit is set in the ARQ header to force the receiver to accept packets subsequent to one or more erroneous or unreceived packets that have been discarded and not resent.

In accordance with another embodiment of the invention, when a NACK has been received and data packets have been discarded, sequence numbers are reassigned to the non-discarded data packets so that a transmitted stream of the non-discarded packets will have consecutive sequence numbers.

In accordance with another embodiment of the invention, at a packet discard the transmitter monitors the receiver state. If a packet is expected which has already been discarded, then the transmitter resynchronizes by renumbering data packets or by commanding the receiver to accept an arbitrarily chosen sequence number.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

FIGS. 1A and 1B illustrate a prior art Go-Back-N technique.

DETAILED DESCRIPTION OF THE INVENTION

In accordance with an exemplary embodiment of the invention involving a communications system wherein a transmitter and a receiver are exchanging data packets, at a packet discard procedure, the progress of a bottom part of a sender window of the transmitter is reported to the receiver in order to allow the receiver to properly skip packets which do not exist anymore because they have been discarded. Thus, the receiver can be commanded to skip or overlook the packets which have been discarded, or in other words, to release any expectation of receiving the packets which have been discarded. To prevent ambiguity problems, special rules are defined for, and followed by, the receiver and the transmitter.

Figure 2:
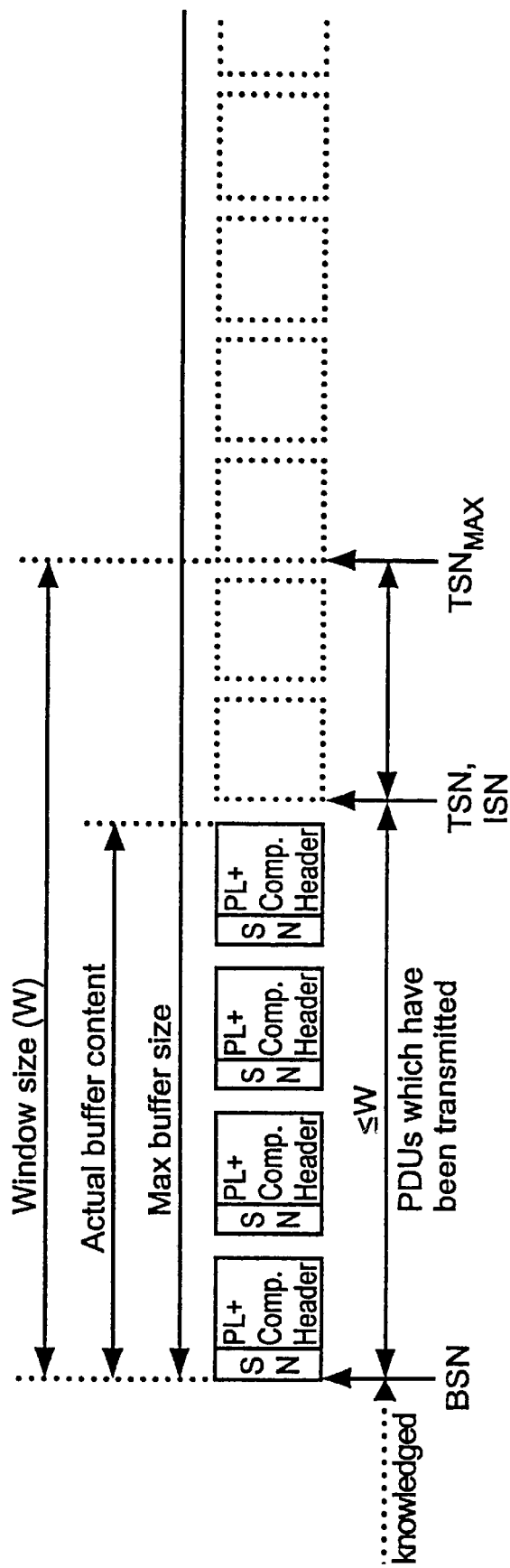
FIG. 2 illustrates a window in a prior art Go-Back-N technique.
Figure 3:
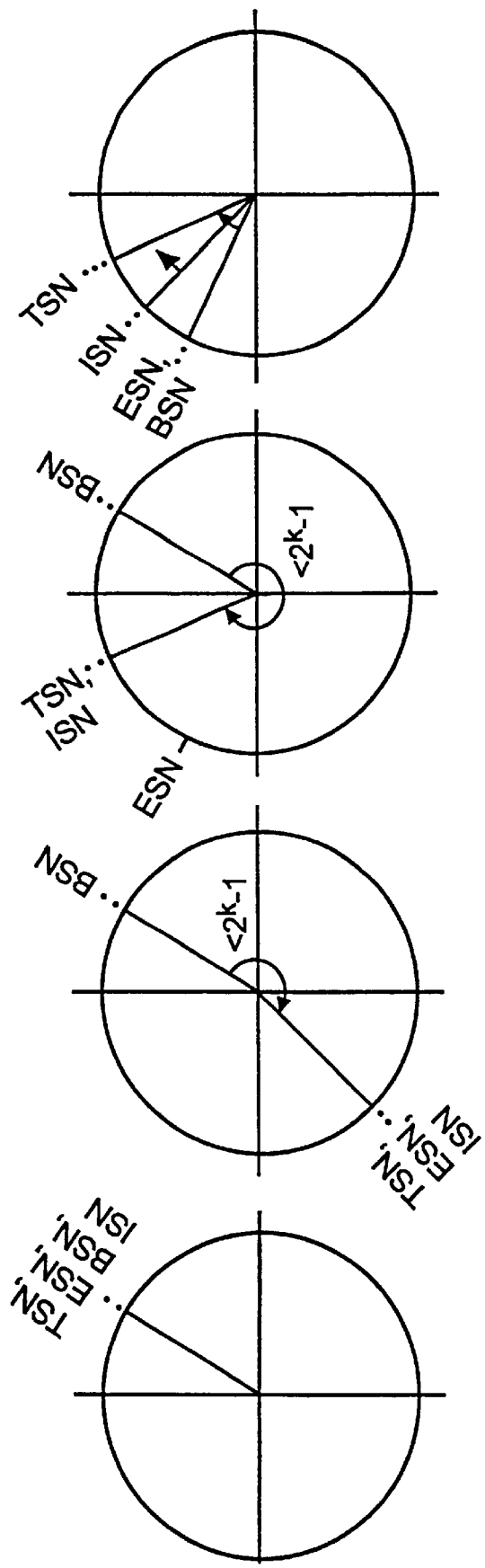
FIGS. 3A–3D illustrate a transmission sequence in a prior art Go-Back-N technique.
Figure 4:
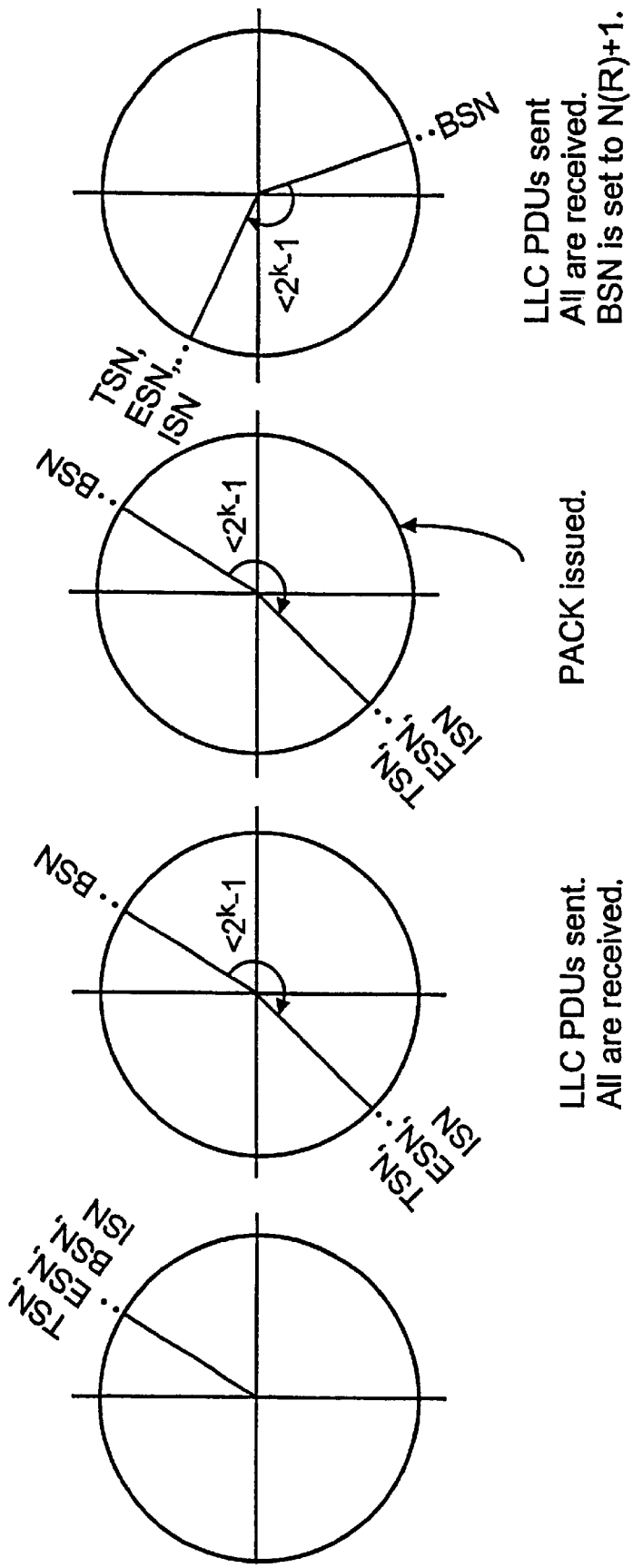
FIGS. 4A–4D illustrate use of a positive acknowledgment in a prior art Go-Back-N technique.
Figure 5:
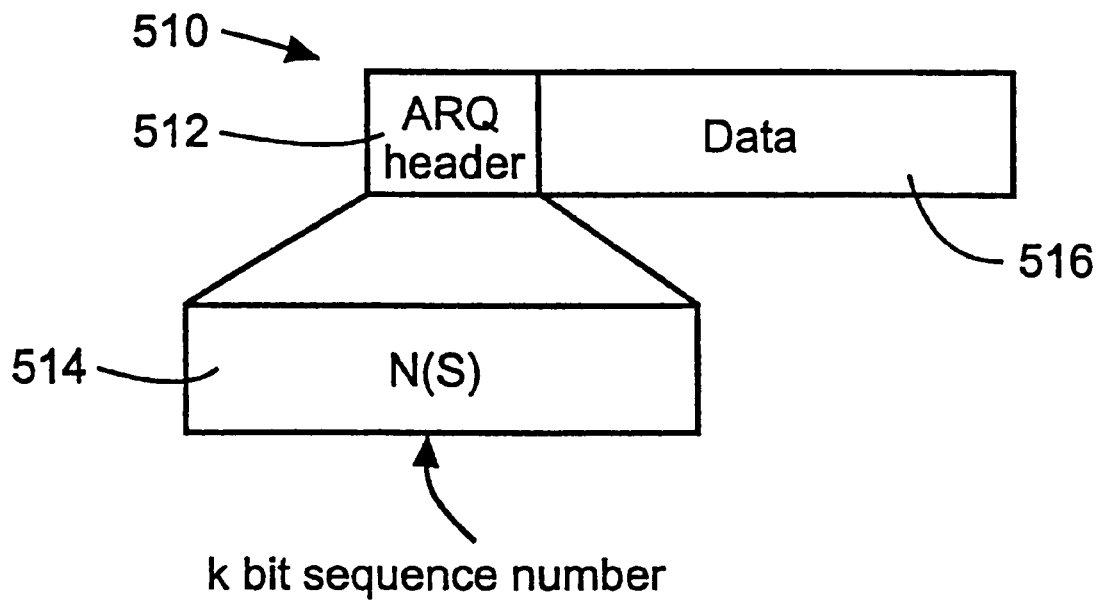
FIG. 5 illustrates a prior art example of an ARQ data packet.
Figure 6:
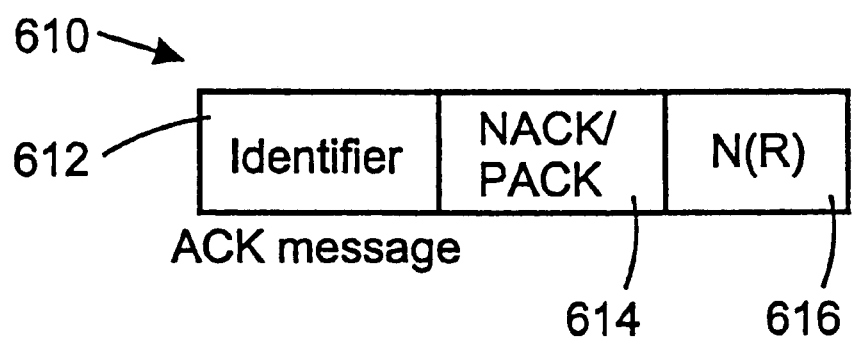
FIG. 6 illustrates a prior art example of an acknowledgement message.
Figure 7:
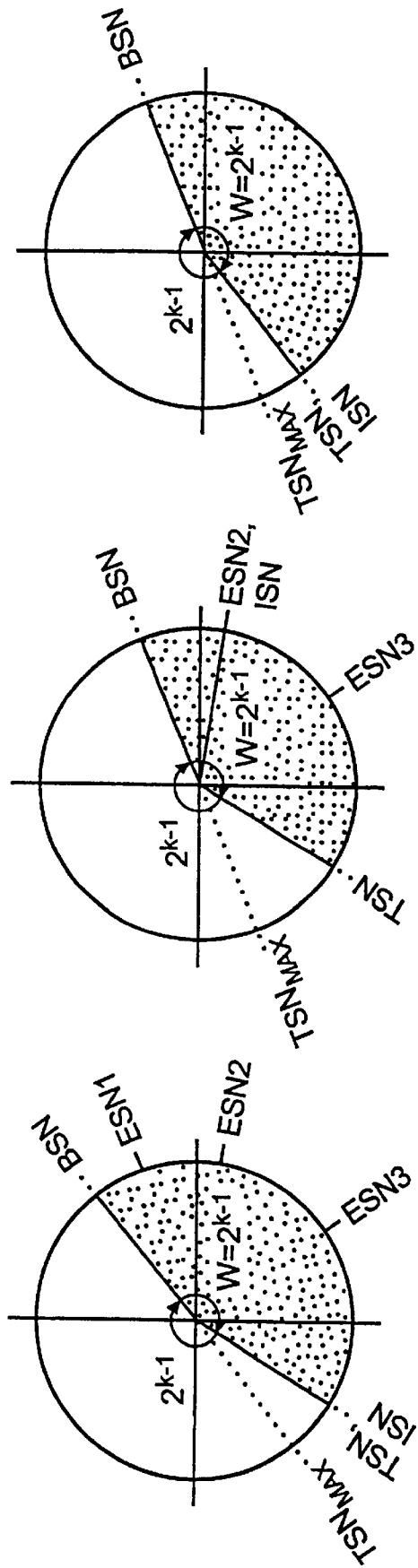
FIGS. 7A–7C illustrate use of a negative acknowledgment in a prior art Selective Reject technique.
Figure 8:
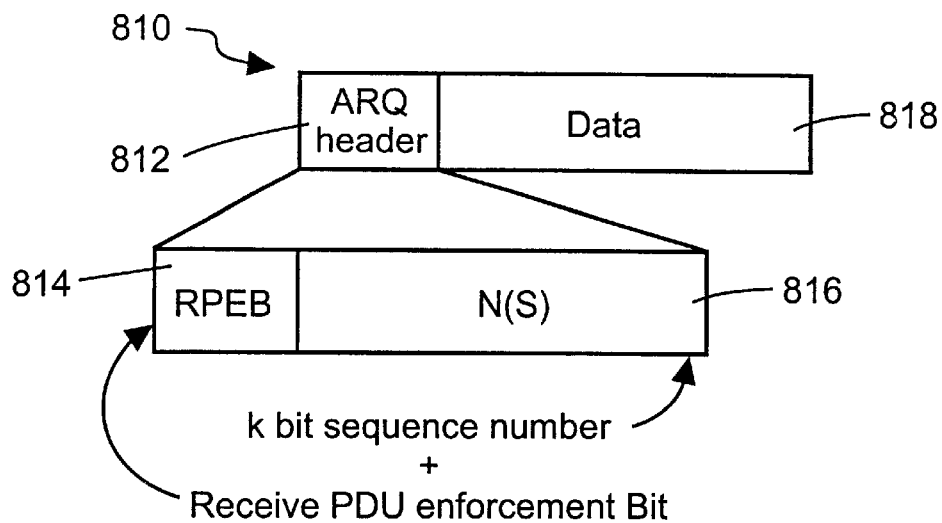
FIG. 8 illustrates a receiver packet enforcement bit in accordance with an embodiment of the invention.

In the case where the transmitter discards a packet, it orders the receiver to accept the next packet, by setting a certain Receiver Packet Enforcement Bit (RPEB) in the ARQ header of the next packet and sending the packet to the receiver. When the receiver receives the packet, the RPEB bit will cause the receiver to accept the packet. FIG. 8 shows an ARQ packet 810 with an ARQ header 812 and a data portion 818. The header 812 includes a receive packet enforcement bit RPEB 814, and a k-bit sequence number N(S) 816. Alternatively, a plurality of enforcement bits can be sent separately from the ARQ packets together with implicit or explicit indications as to which ARQ packet each enforcement bit belongs.

This enforcement function of sending an RPEB associated with a particular ARQ packet, can be used a variety of situations. For example, a situation can arise where a NACK associated with an ARQ packet designated by a sequence number N(R) is sent by the ARQ receiver and properly received by the ARQ transmitter. If the NACK is valid for one discarded data packet, then the next data packet to be retransmitted can have an RPEB set to TRUE.

In another example situation, a retransmission timer expires and one or more data packets have been discarded. The next incoming data packet to be transmitted, or the first data packet to be retransmitted, can have an RPEB set to TRUE.

The system can be further configured so that in all other situations, the RPEB associated with a data packet is set FALSE.

In particular, when the system uses a Go-Back-N type packet exchange, two types of packet enforcement schemes can be used. The first type is a general method with an arbitrary window size W, and the second type is a special case of the general method. In the special case, the window size is $W=2^{k-1}$, i.e., half the maximum sequence number.

Figure 9:
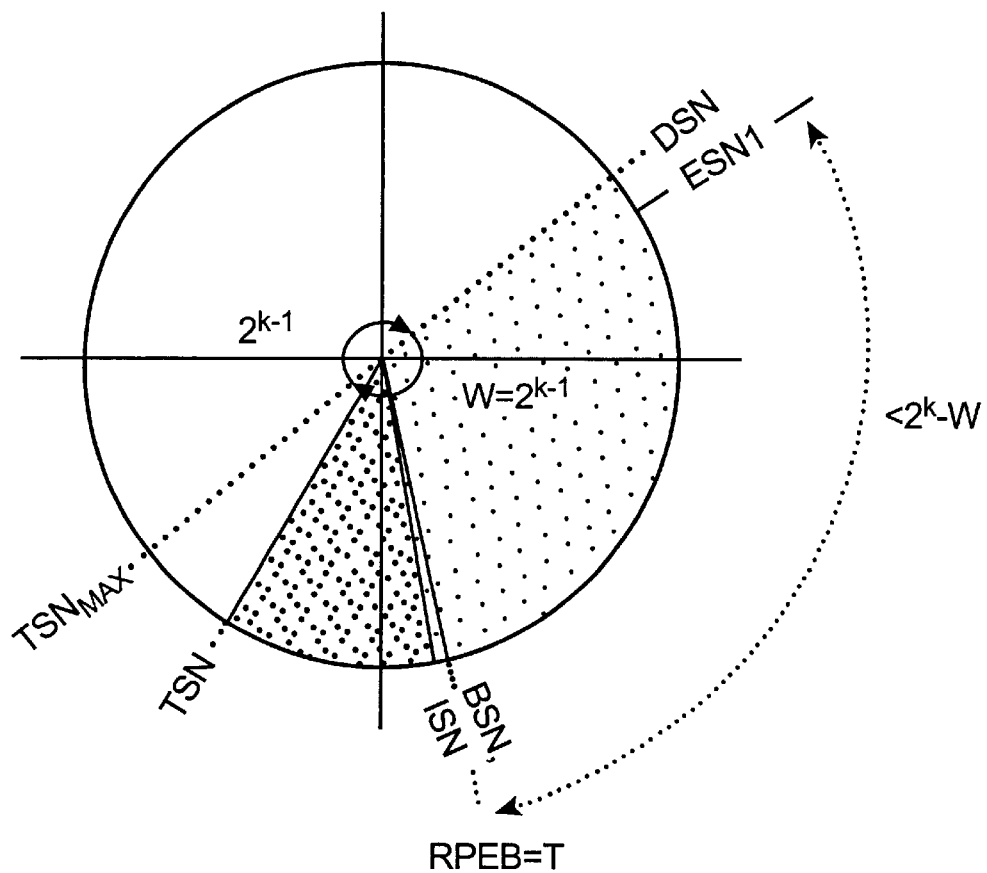
FIG. 9 illustrates operation of an embodiment of the invention.

In the method of the special case, ambiguities can be circumvented by applying very simple rules. The method of the special case employs a new variable, DSN. DSN is shown, for example, in FIG. 9, and indicates that all previous packets have been acknowledged as having been properly transmitted and received. In FIG. 9, all packets from DSN through BSN-1 have been discarded due to a packet discard time-out. A packet discard time-out can occur, for example, when the oldest packets in the buffer have been in the buffer for a predetermined amount of time, and are discarded upon expiration of the predetermined amount of time. When the old packets are discarded, the value of BSN is incremented until it points to the oldest remaining (i.e., undiscarded) packet in the buffer. FIG. 9 shows BSN pointing to the oldest remaining packet in the buffer. After the predetermined amount of time expires, the value of TSN is greater than or equal to the new value of BSN. This indicates that packets from BSN through TSN-1 have been sent. TSN indicates the next new packet to send, and ISN has the same function as indicated earlier, namely, to indicate the sequence number of the next packet to be sent. ESN (e.g., ESN1) indicates the sequence number of the next packet that the receiver expects to receive. To prevent ambiguities, TSN must not pass $TSN_{MAX}$. In this alternative, $TSN_{MAX}$ is $DSN+2^{k-1}$.

Although the data packets between DSN and BSN have been discarded as shown in FIG. 9, for some unknown reason either the previous ACKs have not made their way from the ARQ receiver to the ARQ transmitter or the ARQ packets from ESN1 up to TSN have not been received. That explains why ESN1 is in the sequence of sequence numbers representing discarded ARQ packets, or in other words, why the receiver is expecting a sequence number which has been discarded. At this juncture either a retransmission timer initiates the retransmission, or a NACK is properly received. In both cases, the RPEB is set to TRUE for the next packet to be transmitted. If the difference between N(S) and ESN (for example, ESN1) is less than $2^{k-1}$ and RPEB=TRUE at a packet reception, then the packet will be accepted and forwarded to higher layer as long as the data carried in the packet is also correct.

FIG. 9 also shows that no ambiguity will occur when $TSN_{MAX}$ is defined as $DSN+2^{k-1}$. When ESN (ESN1) lags behind BSN, the receiver can always be forced to receive an ARQ packet whose RPEB=TRUE. If ESN (ESN1) is leading BSN and the RPEB for a received ARQ packet is TRUE, then the packet shall not be accepted. This can be determined by discerning whether BSN-ESN exceeds $W=2^{k-1}$. If a NACK is received in the ARQ transmitter for a higher sequence number than TSN, then a fault has occurred and a reinitialization or a restart is likely to take place. In a reinitialization or a restart, all counters and/or variables are reset to a certain value so that the ARQ can restart anew. For example, the variables can be set so that TSN=ISN=BSN= ESN=DSN, and so forth.

Figure 10A:
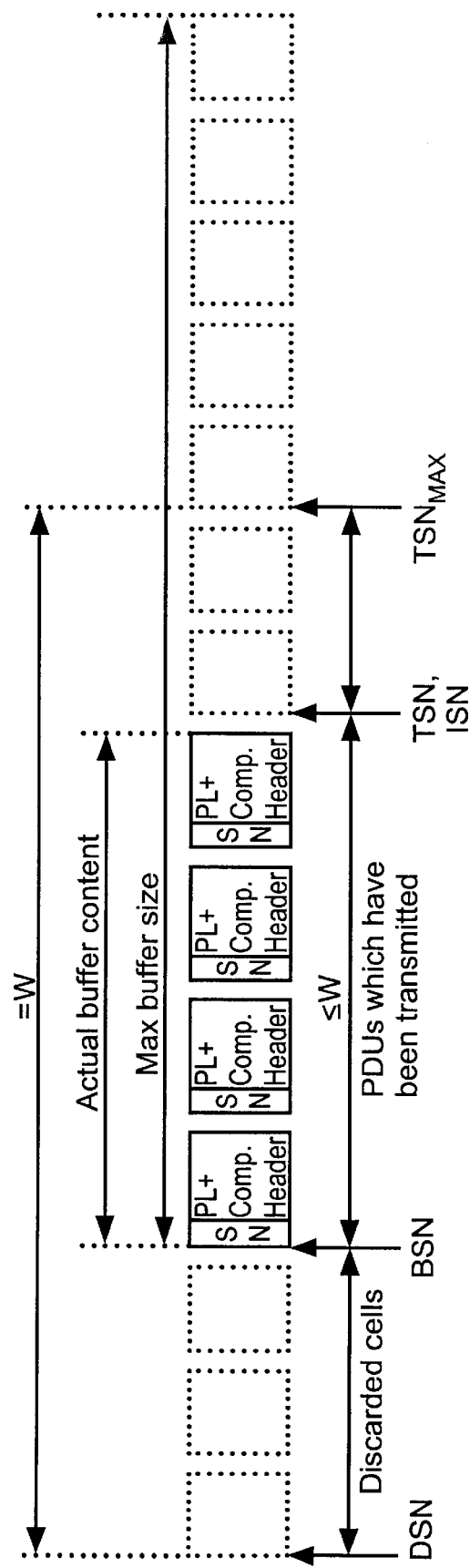
FIGS. 10A and 10B illustrate operation of an embodiment of the invention.
Figure 10B:
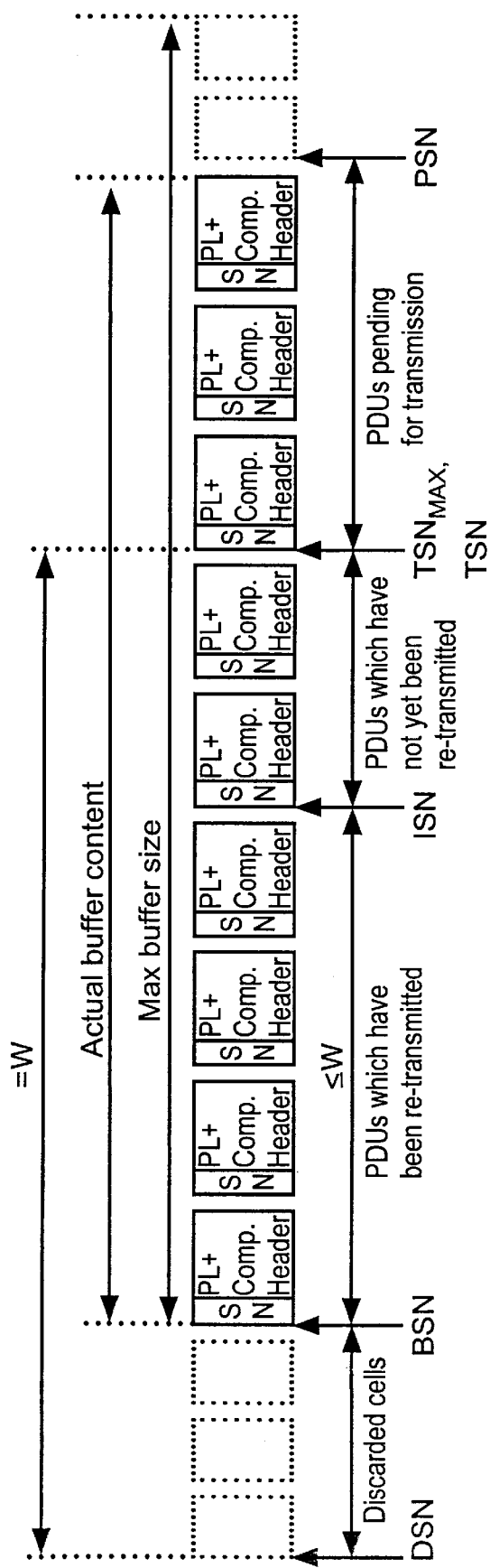

FIGS. 10A and 10B show the variable definitions more precisely, by showing two cases. FIG. 10A shows a case where the content in the buffer is low, and FIG. 10B shows a case where the buffer is very full. FIGS. 10A and 10B also indicate that an upper limit (fixed or dynamic) may exist for the packet buffer. There may also be packets which have been received from the higher layer, but were not allowed to be transmitted since TSN might have reached $TSN_{MAX}$. Such packets would be pending for transmission, and indicated by pending sequence number PSN shown in FIG. 10B. As soon as clearance is given to proceed, the pending packets will be transmitted. Clearance is given when a NACK or PACK is properly received, thereby causing DSN and perhaps also BSN to progress forward. This allows $TSN_{MAX}$ to progress forward also.

The more general case, on the other hand, requires more complex rules. The function of the ARQ transmitter with an arbitrary window size representing a more general case is next described.

Figure 11:
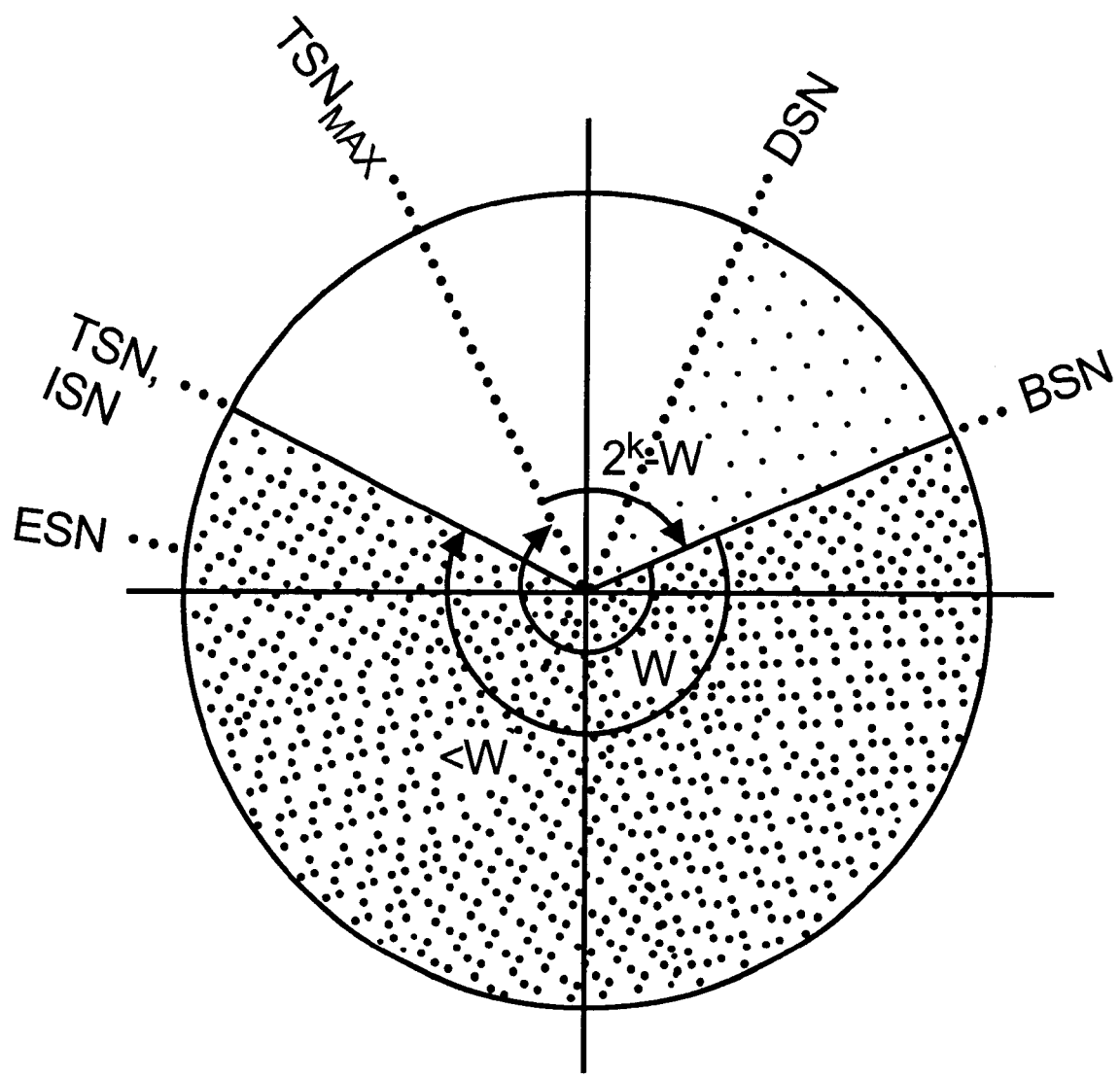
FIG. 11 illustrates operation of an embodiment of the invention.

FIG. 11 shows an arbitrary state of the ARQ. The general case differs from the special case described above in that the window size (W) is defined using BSN rather than DSN. This gives the greatest possible distance between the last acknowledged packet (DSN) and the highest sent packet (TSN). As in the special case, TSN may not pass $TSN_{MAX}$. $TSN_{MAX}$=BSN+W, where $1 \leq W \leq 2^{k-1}$.

Below, the sign $\leq$ is used. It is used more in the "before" and "after" sense than in the ordinary mathematical sense, since we are using modulus arithmetic. For example, assume k=8 bits, BSN=192 and W=128. This yields BSN+W=(192+128)mod$2^k$=64. TSN can be, e.g., 254, which is before BSN+W, even though mathematically 254>(192+128) mod$2^k$=64.

Some important conditions are $TSN \leq DSN-1$, $TSN \leq TSN_{MAX}$, and $DSN \leq BSN \leq TSN$, where $TSN_{MAX}$=BSN+W. W can assume an arbitrary value between 1 and $2^{k}-1$. However, the receiver and transmitter must both use the same arbitrary value for W.

A packet shall be accepted, apart from the normal Go-Back-N function, when N(S)-ESN<$2^k$-W, RPEB=TRUE and the data in the packet are correct.

An additional rule for the general case is that in order to avoid ambiguity problems, BSN-DSN shall always be less than $2^k$-W. If a situation arises where (BSN-DSN)=$2^k$-W, then typically either a resynchronization will take place, or a notification indicating bad link performance will be sent to the control and management layer. The control and management layer can then implement a countermeasure to handle the problem.

Figure 12:
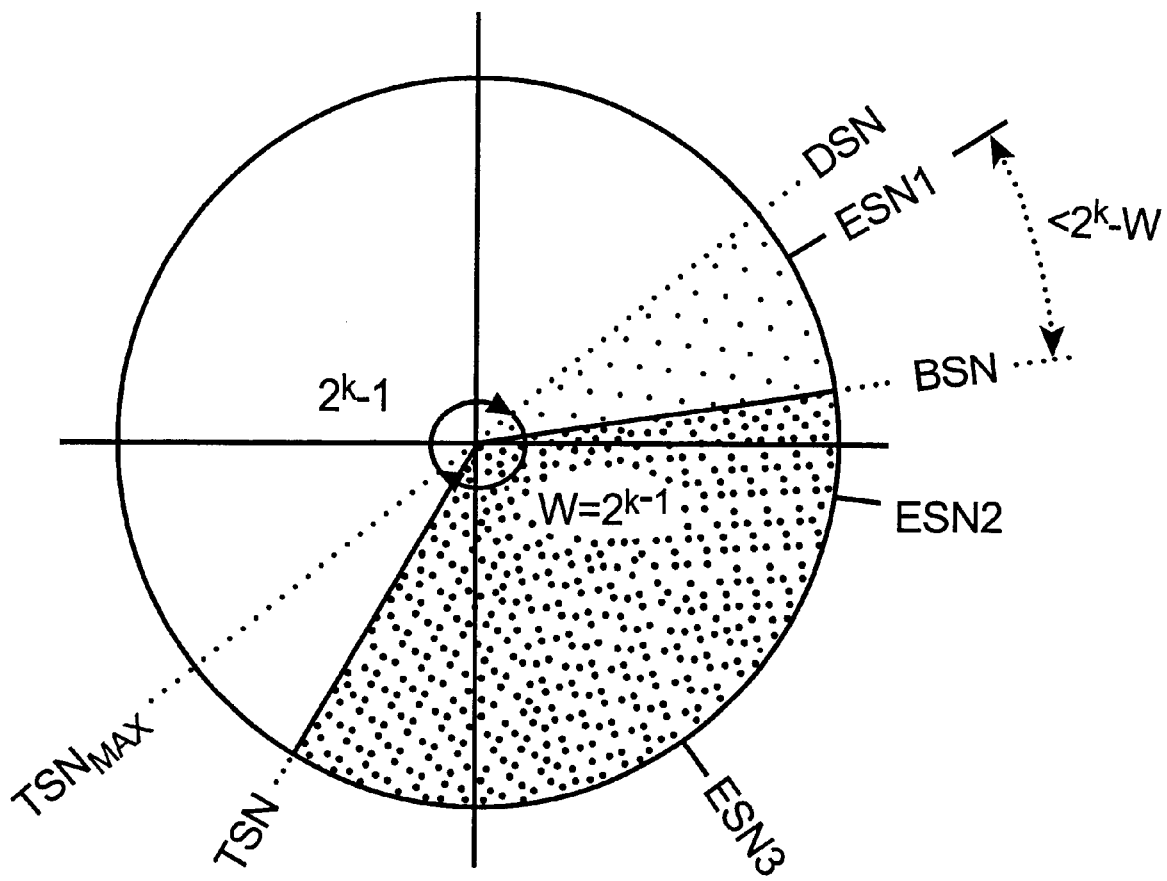
FIG. 12 illustrates operation of an embodiment of the invention.

In another exemplary embodiment of the invention illustrated for example in FIG. 12, a Selective Reject type packet exchange is used that relies on the same basic principles described above with respect to the special and general cases for use with a Go-Back-N type packet exchange. Namely, a receive enforcement bit such as the RPEB described above with respect to other embodiments, is sent to facilitate discarding of packets from a transmitter buffer.

In this embodiment, the basic rules include $DSN \leq BSN \leq TSN \leq TSN_{MAX}$ and $TSN_{MAX}-DSN=2^{k-1}$. The variable definitions are the same as those described above with respect to other embodiments. Some additional rules on how to handle NACK, PACK and automatic retransmission of packets will also be described below.

In a situation where a number of packet retransmissions have taken place, a packet discard time-out can occur that will cause the oldest, not-yet-acknowledged packets in the buffer to be discarded. This can be seen, for example, in FIG. 12, where the packets having sequence numbers between DSN and BSN have been discarded.

After the old packets have been discarded from the transmitter buffer, two things can happen. Either a packet retransmission command is invoked by a timer expiration, or a NACK is received for a sequence number falling between DSN and BSN. First, consider the NACK case.

Assume that one use of NACK includes the following characteristics. When a NACK is sent, the oldest not-yet-received packet is explicitly indicated by its sequence number. Packets with sequence numbers preceding this oldest, outstanding packet are at the same time positively acknowledged by this NACK message. Accompanying this NACK can be a) a bitmap of length n indicating outstanding packets, wherein, for example, those bits that are set to one indicate outstanding packets, or b) a number N of explicitly indicated sequence numbers for which packets have not been received, or c) some combination of a) and b).

In a first case, with reference to FIG. 12, if a NACK is received for ESN1 in the interval DSN to BSN and the covered ACK range for the NACK is less than BSN-ESN1 and at least one packet is not yet discarded (TSN≠BSN), then the packet indicated by BSN with RPEB set to True, is retransmitted. Note that the transmitter can also send a short control message, in order to inform the receiver that packets have been discarded, thereby saving bandwidth.

In a second case, if a NACK is received for ESN1 located in the interval between DSN and BSN and the covered ACK range for the NACK is less than BSN-ESN1 and all packets have been discarded, i.e. BSN=TSN, then a pending packet with RPEB=TRUE is sent. However, if no packet is pending for transmission, then the system either a) waits until the next packet is received from the higher layer and then sends this packet with RPEB=TRUE, or b) informs the receiver that there are currently no more packets to send. A shorter message than the packet can be used instead to inform the receiver that packets have been discarded; thereby conserving bandwidth.

In a third case, if a NACK is received for ESN1 in the interval DSN to BSN, and the covered ACK range for the NACK is greater than BSN-ESN1, and at least one packet is not yet discarded, and at least one outstanding packet exists that has a sequence number $\geq$BSN, then the first outstanding packet after BSN, as indicated by the NACK message, is retransmitted with RPEB=TRUE.

In a fourth case, if a) a NACK is received for ESN1 in the interval between DSN and BSN, and b) the covered ACK range for the NACK is greater than BSN-ESN1, and c) at least one packet exists that has been sent but not acknowledged either positively or negatively and which has a sequence number after the packet indicated by the NACK message, and d) there are no outstanding packets indicated in the NACK message with sequence numbers $\geq$BSN, then the first packet after the packets indicated in the NACK message is retransmitted with RPEB=TRUE. A shorter message than the packet can be used instead to inform the receiver that packets have been discarded, thereby saving bandwidth.

In a fifth case, if a) a NACK is received for ESN1 in the interval DSN to BSN, and b) the covered ACK range for the NACK is greater than BSN-ESN1, and c) no packet exists after the packet indicated by the NACK message, and d) there are no outstanding packets indicated in the NACK message with sequence numbers $\geq$BSN, then a packet which is pending for transmission is sent with RPEB=TRUE. In other words, when all packets having sequence numbers N(S) in the range from BSN to TSN (i.e., TSN$\leq$N(S)$\leq$BSN) have been positively acknowledged, then a packet which is pending for transmission is sent with RPEB=TRUE. However, if no packet is pending for transmission, then the system waits until the next packet is received from the higher layer and then sends this next packet with RPEB=TRUE, or alerts the receiver that there are currently no more packets to send. A shorter message than the packet can be used instead to alert the receiver that packets have been discarded, thereby saving bandwidth.

In a sixth case, when a timer-initiated retransmission of a packet occurs, and ISN=BSN, then RPEB should be set to TRUE. Otherwise, RPEB should be set to FALSE. Alternatively, RPEB can be set to TRUE when ((ISN=BSN) and (BSN≠DSN)), and can otherwise be set to FALSE.

When a correct packet with RPEB=TRUE is received, then all packets preceding this packet and up to the next outstanding packet will be released from the buffer and forwarded to the higher layer. The application or the other layers decide whether the packets can be used or not, if delay and assembly requirements are met.

In the case where a window of size $<2^{k-1}$ is used, no additional discard capability concerns are necessary to consider, beyond the ordinary requirement imposed by Selective Reject itself.

In another embodiment of the invention for use with a Go-Back-N scheme, it is assumed that resynchronization takes place only when a NACK is received and N(R)<BSN. Then the transmitter will have full knowledge of the receiver state, i.e., ESN is known. Note that there exists a case where a NACK as described above is received and the receiver can wait one round-trip delay period to ensure full knowledge of the receiver state. In other words, when a retransmission of the NACKed packet has just been performed and it is not known if the packet has passed all buffers and other delay-causing functions, the receiver can wait one round-trip delay period. Here, renumbering of packets sequence number can be performed, such that the first ARQ packet sent after the renumbering will carry the same sequence number as that of the packet to which the NACK referred.

Figure 13:
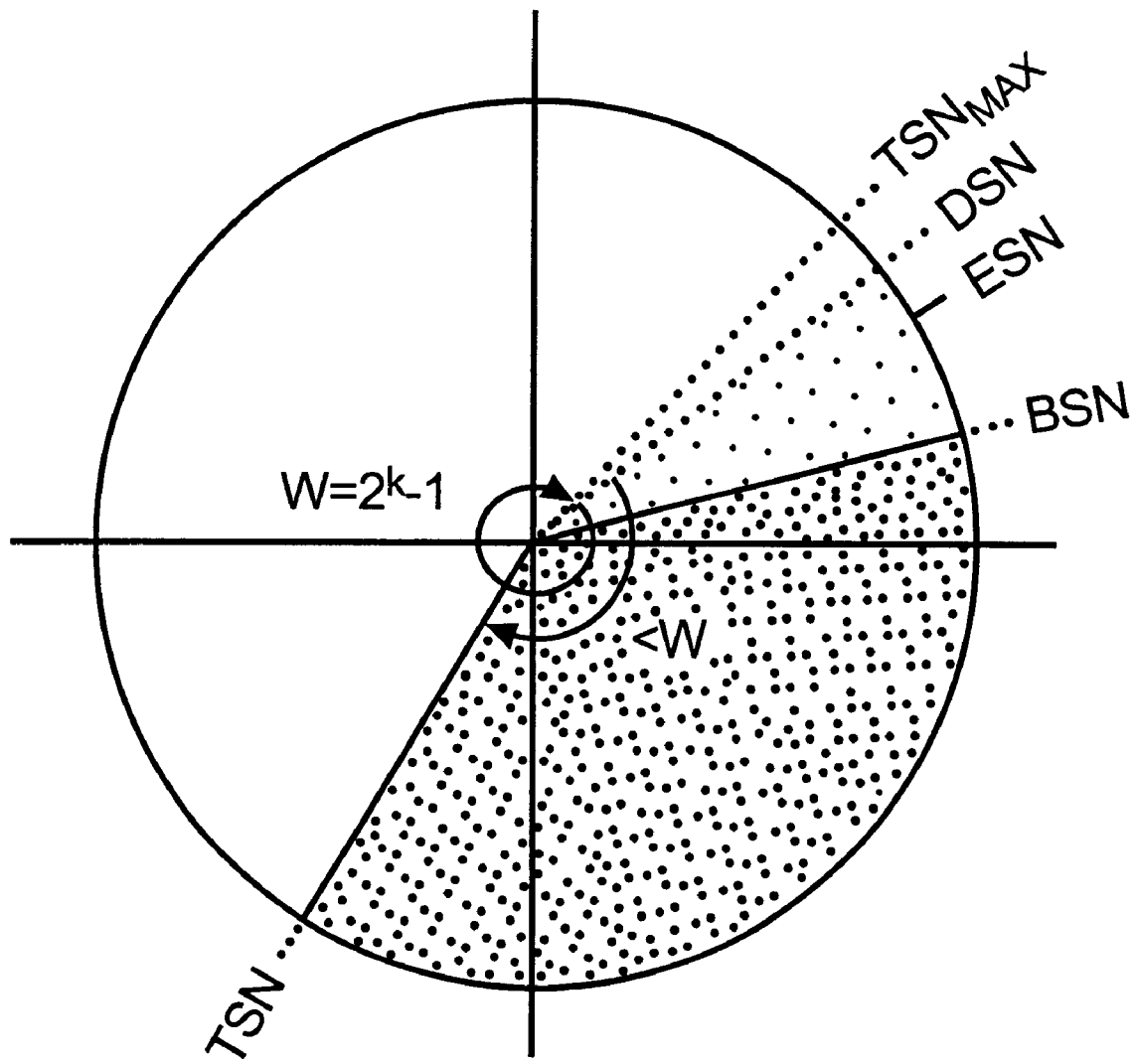
FIG. 13 illustrates operation of an embodiment of the invention.

In FIG. 13, a NACK is received for a discarded packet, since ESN precedes BSN. Consequently, all subsequent packets from BSN and onwards are renumbered such that the BSN packet starts with ESN, the BSN+1 packet is renumbered to ESN+1, and so on. Note, renumbering is not performed for timer-initiated retransmissions.

In another embodiment of the invention for use with a basic Go-Back-N scheme, the receiver and the transmitter are resynchronized at each discard occasion. In this embodiment, ARQ packets can only be discarded if they have not previously been acknowledged.

The resynchronization is initiated by the transmitter, since it knows when a discard has been performed. The transmitter ask for a sequence number, up to which (but not including) the receiver has accepted ARQ packets. If the sequence number is before the last discarded sequence number, then the transmitter commands the receiver to start over from some arbitrarily chosen, but predefined, sequence number. The next sent packets are numbered upwards from this arbitrarily chosen sequence number. As an alternative, only the transmitter is resynchronized, such that the first packet sent after the resynchronization has the same sequence number as the next packet expected by the receiver.

In various embodiments of the invention, a magnitude of W can be defined when a call is initially set up between a transmitter and a receiver within a data network, in accordance with the particular application involved. For example, when the transmitter is initialized by a higher layer of software in the data network, it can select the magnitude of W and inform the receiver of this magnitude, and vice versa. The information indicating the magnitude of W can be sent from the transmitter to the receiver (or vice versa) using a control message.

In summary, the various embodiments of the invention increase throughput of a communications system using ARQ packets by discarding outdated packets. In addition, the various embodiments of the invention reduce a risk that the ARQ buffer in the transmitter will overflow. Those skilled in the art will also recognize that the principles described above with respect to the various embodiments of the invention can be applied to Stop-and-Wait ARQ schemes.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method for discarding packets in a data network employing a packet transfer protocol including an automatic repeat request scheme, comprising the steps of:

a transmitter in the data network commanding a receiver in the data network to a) receive at least one packet having a sequence number that is not consecutive with a sequence number of a previously received packet and b) release any expectation of receiving outstanding packets having sequence numbers prior to the at least one packet; and the transmitter discarding all packets for which acknowledgment has not been received, and which have sequence numbers prior to the at least one packet.

2. The method of claim 1, wherein each of the at least one packet includes a receive enforcement bit, and the step of commanding comprises the steps of:

setting the receive enforcement bit for each of the at least one packet to a TRUE value; and sending the at least one packet to the receiver.

3. The method of claim 1, wherein the step of commanding comprises the steps of:

setting a receive enforcement bit to a TRUE value for each at least one packet; and sending the at least one receive enforcement bit set to TRUE together with identification of a transmitter sending the packets and the sequence numbers of the packets in a control message to the receiver.

4. The method of claim 1, wherein the method pertains to a go-back-n automatic repeat request scheme and further comprises the steps of:

defining a maximum top sequence number equal to a value $(DSN+2^{k-1})$, where DSN is a sequence number indicating that all packets having sequence numbers previous to DSN have been acknowledged by a receiver in the data network as having been received, and k is a number of bits in a sequence number field for a packet in the data network;

accepting a received packet when a receive enforcement bit for the received packet is set to TRUE and $N(S)-ESN<2^{k-1}$, where N(S) is a sequence number of the received packet and ESN is an expected sequence number of a next packet to be received; and performing one of a) a restart of the automatic repeat request scheme and b) reporting a failure event to a management control system when the receive enforcement bit for the received packet is set to TRUE and $N(S)-ESN \geq 2^{k-1}$.

5. The method of claim 1, wherein the method pertains to a go-back-n automatic repeat request scheme and further comprises the steps of:

constraining a top sequence number TSN according to the rules $(TSN \leq DSN-1)$, $(TSN \leq BSN+W)$ and $(1 \leq W \leq 2^{k-1})$, where k is a number of bits in a sequence number field for a packet in the data network, DSN is a sequence number indicating that all packets having sequence numbers previous to DSN have been acknowledged by a receiver in the data network as having been received, BSN is a bottom sequence number indicating a sequence number of an oldest packet stored in a transmit buffer of a transmitter in the data network, and W is a window size known to both the receiver and the transmitter, within which packets are tracked;

accepting a received packet when a receive enforcement bit for the received packet is set to TRUE and $N(S)-ESN<2^k-W$, where $N(S)$ is a sequence number of the received packet and ESN is an expected sequence number of a next packet to be received;

performing one of a) a restart of the automatic repeat request scheme and b) reporting a failure event to a management control system when the receive enforcement bit for the received packet is set to TRUE and $N(S)-ESN \geq 2^k-W$; and constraining BSN according to the rule (DSN≦BSN≦TSN).

6. The method of claim 1, wherein the method pertains to a selective repeat automatic repeat request scheme and further comprises the steps of:

constraining a bottom sequence number BSN indicating a sequence number of an oldest packet stored in a transmit buffer of a transmitter in the data network, and a top sequence number TSN according to the rules (DSN≦BSN≦TSN≦TSN$_{MAX}$), where DSN is a sequence number indicating that all packets having sequence numbers previous to DSN have been acknowledged by a receiver in the data network as having been received, TSN$_{MAX}$ is a maximum top sequence number, (TSN$_{MAX}$–DSN=$2^{k-1}$), and k is a number of bits in a sequence number field for a packet in the data network;

accepting a received packet when a receive enforcement bit for the received packet is set to TRUE and $N(S)-ESN<2^{k-1}$, where $N(S)$ is a sequence number of the received packet and ESN is an expected sequence number of a next packet to be received; and performing one of a) a restart of the automatic repeat request scheme and b) reporting a failure event to a management control system when the receive enforcement bit for the received packet is set to TRUE and $N(S)-ESN \geq 2^{k-1}$.

7. The method of claim 6, further comprising the steps of:

when a) a first packet having a sequence number after DSN and before BSN is negatively acknowledged, b) a number of packets that are prior to the first packet and not positively acknowledged is less than a difference between BSN and the sequence number of the first packet, and c) TSN≠BSN, setting a receive enforcement bit for the packet indicated by BSN and resending the packet indicated by BSN from the transmitter to the receiver.

8. The method of claim 6, further comprising the steps of:

when a) a first packet having a sequence number after DSN and before BSN is negatively acknowledged, b) a number of packets that are prior to the first packet and not positively acknowledged is less than a difference between BSN and the sequence number of the first packet, and c) TSN=BSN, if a packet is pending for transmission, then setting a receive enforcement bit for the pending packet to TRUE and sending the pending packet from the transmitter to the receiver;

if no packets are pending for transmission, then performing one of a) waiting until a packet is received from a higher layer and b) informing the receiver that no packets are pending.

9. The method of claim 6, further comprising the steps of:

when a) a first packet having a sequence number after DSN and before BSN is negatively acknowledged, b) a number of packets that are prior to the first packet and not positively acknowledged is greater than a difference between BSN and the sequence number of the first packet, and c) TSN≠BSN, setting a receive enforcement bit for a first outstanding packet after BSN and resending the first outstanding packet from the transmitter to the receiver.

10. The method of claim 6, further comprising the steps of:

when a) a first packet having a sequence number after DSN and before BSN is negatively acknowledged, b) a number of packets that are prior to the first packet and not positively acknowledged is greater than a difference between BSN and the sequence number of the first packet, c) at least one packet exists after the first packet, and d) there are no negatively acknowledged packets having sequence numbers after BSN, setting a receive enforcement bit for a first packet after BSN and resending the first packet after BSN from the transmitter to the receiver.

11. The method of claim 6, further comprising the steps of:

when a first packet having a sequence number after DSN and before BSN is negatively acknowledged, and all packets having sequence numbers greater than or equal to BSN and less than TSN have been positively acknowledged, if a packet is pending for transmission, then setting a receive enforcement bit for the pending packet to TRUE and sending the pending packet from the transmitter to the receiver;

if no packets are pending for transmission, then performing one of a) waiting until a packet is received from a higher layer and b) informing the receiver that no packets are pending.

12. The method of claim 6, further comprising the steps of:

when a timer-initiated retransmission of a packet occurs, and ISN=BSN, setting a receive enforcement bit for the packet to TRUE; and when a timer-initiated retransmission of the packet occurs, and ISN≠BSN, setting the receive enforcement bit for the packet to FALSE; wherein ISN indicates a sequence number of a next packet to be sent.

13. The method of claim 6, further comprising the steps of:

when (ISN=BSN) and (BSN≠DSN), setting a receive enforcement bit for the packet to TRUE, and otherwise setting the receive enforcement bit for the packet to FALSE, where ISN indicates a sequence number of a next packet to be sent.

14. A method for discarding packets in a data network employing a packet transfer protocol including a go-back-n automatic repeat request scheme, comprising the steps of:

discarding at least one packet from a transmitter;

receiving a NACK for the at least one packet from a receiver; and assigning consecutive sequence numbers to non-discarded packets adjacent to the at least one packet.

15. A method for discarding packets in a data network employing a packet transfer protocol including a go-back-n automatic repeat request scheme, comprising the steps of:

a transmitter in the data network discarding at least one packet that has been sent by the transmitter but has not been acknowledged by a receiver in the data network as received;

after discarding the at least one packet, resynchronizing the transmitter and the receiver so that the last packet received by the receiver and the next packet to be transmitted by the transmitter have consecutive sequence numbers.

16. The method of claim 15, wherein the step of resynchronizing comprises the steps of:

determining what sequence number the receiver expects to receive next; and when the expected sequence number is different from the sequence number of the packet to be sent next from the transmitter, assigning the expected sequence number to the packet to be sent next from the transmitter.

17. The method of claim 15, wherein the step of resynchronizing comprises the steps of:

determining what sequence number the receiver expects to receive next; and when the expected sequence number is different from the sequence number of the packet to be sent next from the transmitter, commanding the receiver to expect a sequence number of a next packet to be sent from the transmitter to the receiver.

18. The method of claim 15, wherein the step of resynchronizing comprises the step of commanding the receiver to expect a sequence number of a next packet to be sent from the transmitter to the receiver.

19. A method for discarding packets in a data network employing a packet transfer protocol including a go-back-n automatic repeat request scheme, comprising the steps of:

a transmitter in the data network discarding at least one packet that has been sent by the transmitter but has not been acknowledged by a receiver in the data network as received;

after discarding the at least one packet, resynchronizing the receiver and the transmitter by determining what sequence number the receiver next expects, and consecutively renumbering packets pending at the transmitter starting with the expected sequence number.

* * * * *